May 15, 1951  J. C. JOHNSON ET AL  2,553,139
RECIPROCATING FEEDER FOR CLOSURE CAPS
Filed Aug. 6, 1947  3 Sheets-Sheet 1
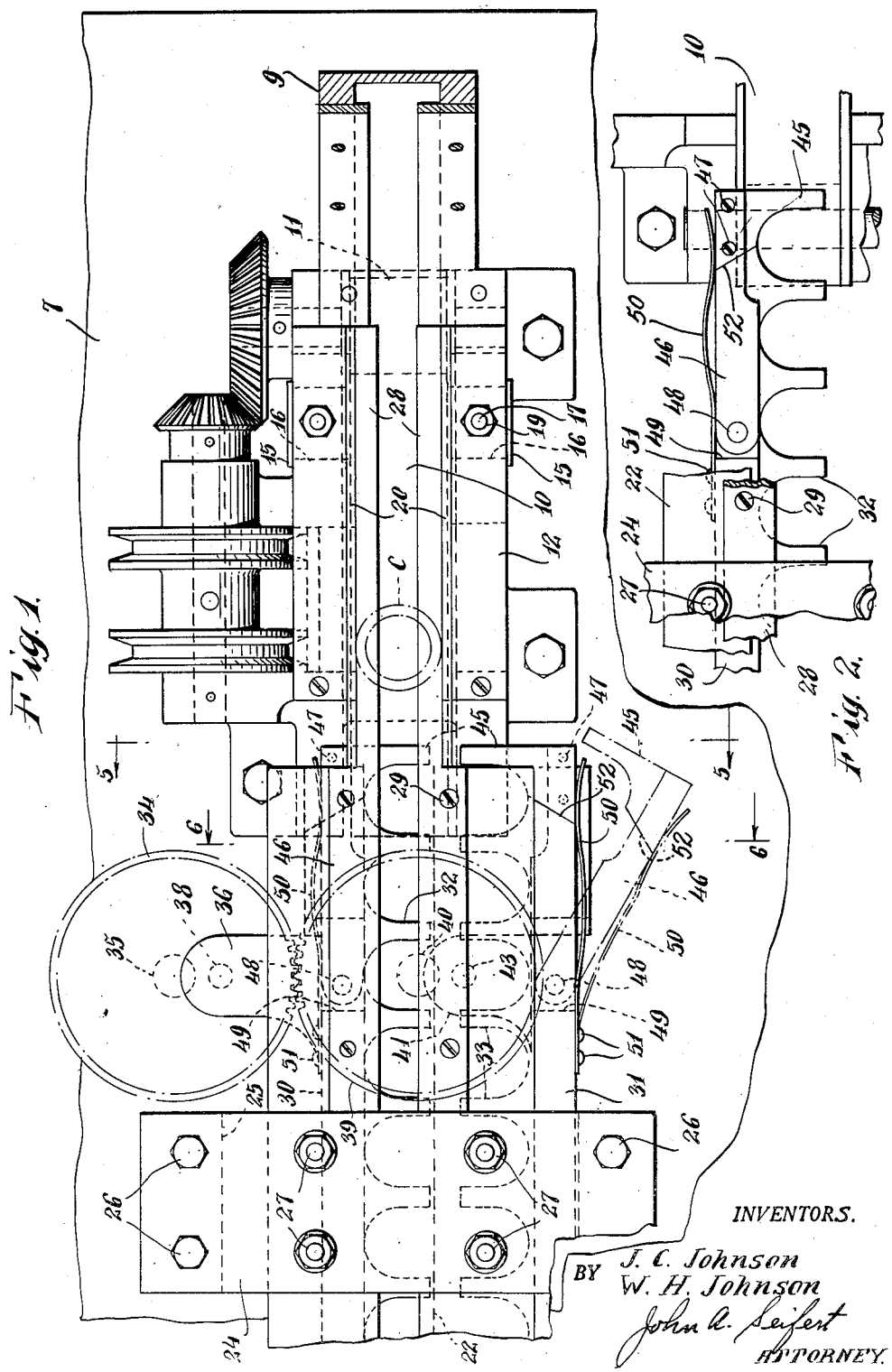
INVENTORS.
J. C. Johnson
W. H. Johnson
BY John R. Seifert
ATTORNEY.

May 15, 1951  J. C. JOHNSON ET AL  2,553,139
RECIPROCATING FEEDER FOR CLOSURE CAPS
Filed Aug. 6, 1947  3 Sheets-Sheet 2
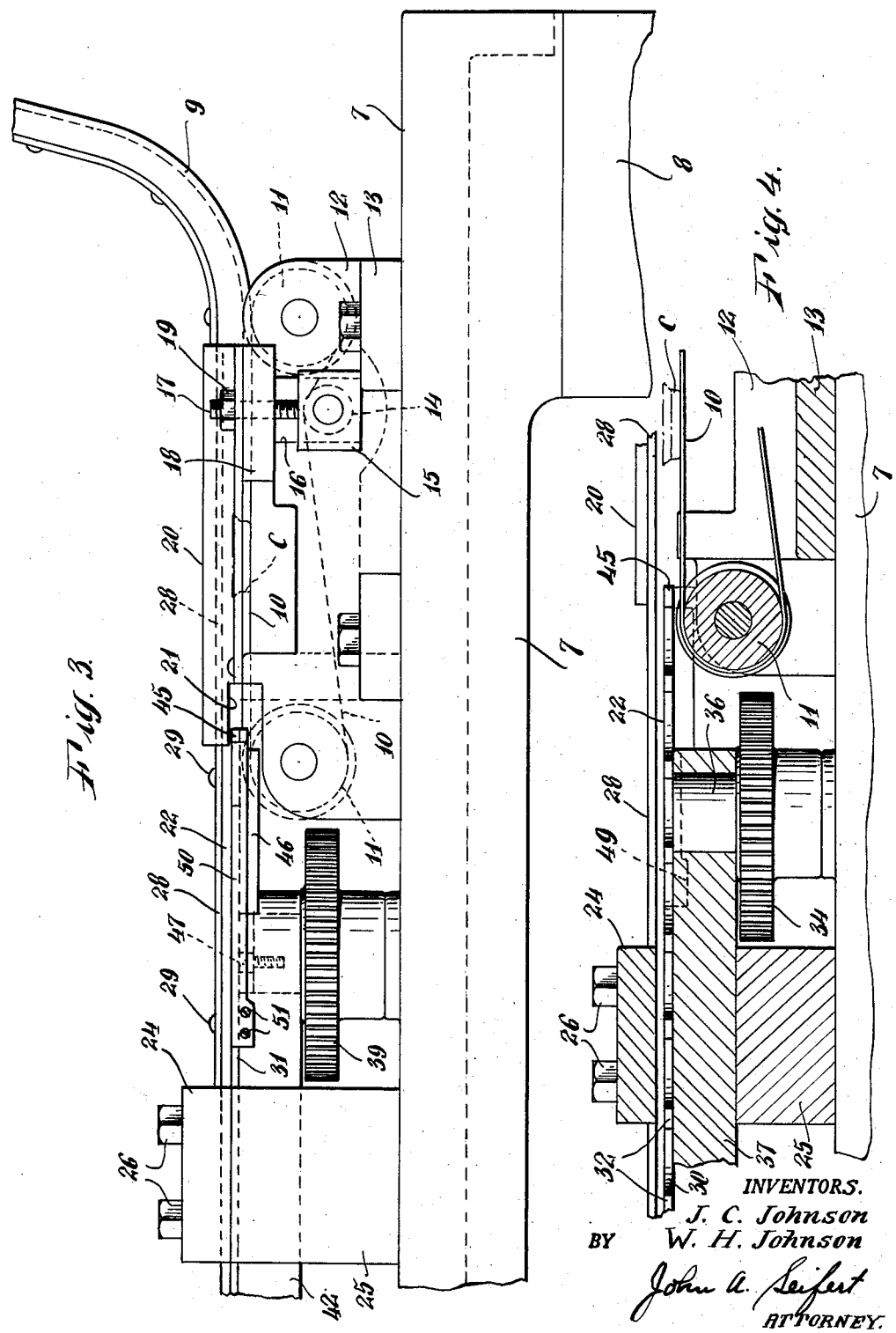
INVENTORS.
J. C. Johnson
W. H. Johnson
BY
John A. Seifert
ATTORNEY.

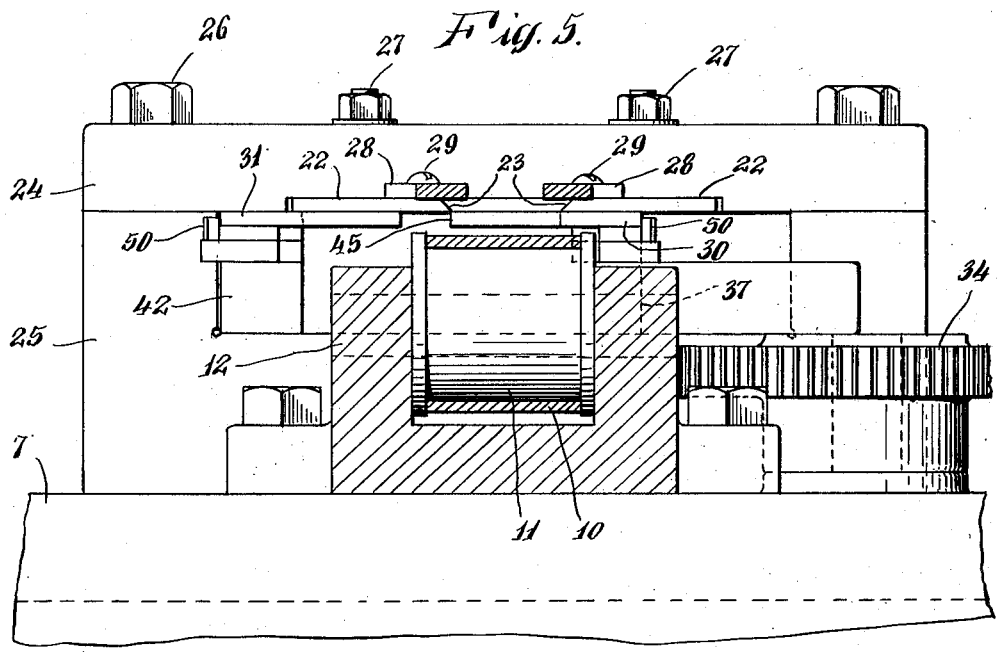
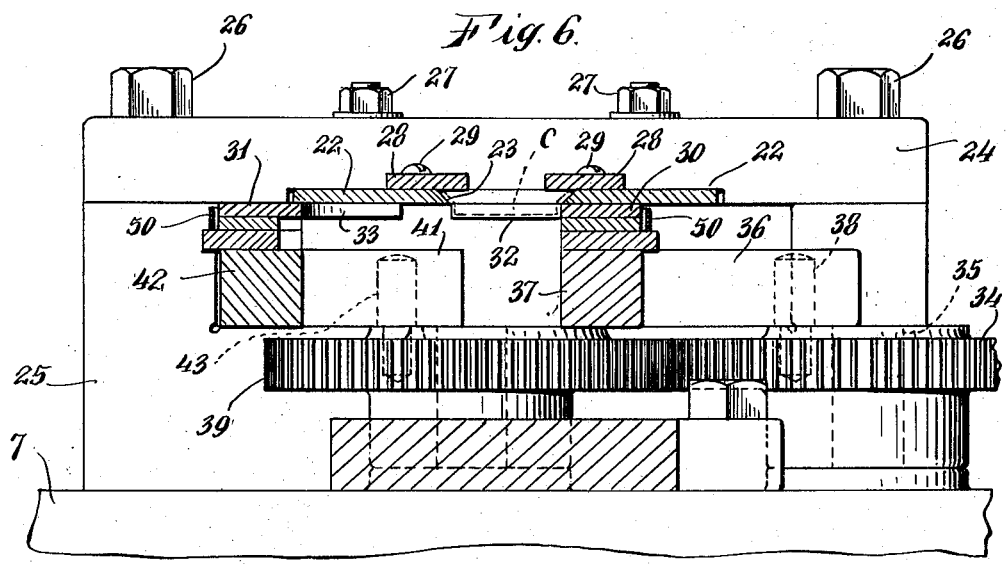

Patented May 15, 1951

2,553,139

UNITED STATES PATENT OFFICE 2,553,139

RECIPROCATING FEEDER FOR CLOSURE CAPS

John C. Johnson, East Hempstead, and Walter H. Johnson, Kings Point, N. Y.

Application August 6, 1947, Serial No. 766,512

4 Claims. (Cl. 198—221)

This invention relates to apparatus for assembling sealing pads and/or protective spots on the sealing pads in closure caps of the type commonly termed "crowns" having the flaring marginal portion of the flange arranged with corrugations or ruffles, and particularly to the feeding or conveying of the closure caps relative to successive devices for depositing adhesive in the closure caps, for creating a heated zone to render the adhesive tacky, for inserting sealing pads in the closure caps in contact with the tacky adhesive, and/or for applying protective spots on the sealing pads. The present invention relates to an improvement in the feeding or conveying means disclosed in the application of John C. Johnson, Serial No. 680,315, filed June 28, 1946 and issued as Patent No. 2,484,095 October 11, 1949.

It is the principal object of the present invention to prevent damaging of the closure caps during the transfer thereof from a supply hopper to means to convey the closure caps relative to the assembling devices.

In the drawings accompanying and forming a part of this application, Figure 1 is a plan view of the closure cap receiving end of the apparatus shown in application Serial No. 680,315 and showing the improved means forming the embodiment of the present invention.

Figure 2 is a view showing a detailed construction of said improved means.

Figure 3 is a side elevational view of said closure cap receiving end of the apparatus looking at the bottom of Figure 1.

Figure 4 is a longitudinal sectional view of Figure 3.

Figure 5 is a cross sectional view, on an enlarged scale, taken on the line 5—5 of Figure 1 looking in the direction of the arrows.

Figure 6 is a cross sectional view, on an enlarged scale, taken on the line 6—6 of Figure 1 looking in the direction of the arrows.

The embodiment of the invention is shown in connection with the closure cap receiving end portion of an assembling apparatus including a table 7 supported by a standard 8, as shown in Figure 3.

The empty or unassembled cap members c of the closures are delivered to the apparatus from a supply hopper (not shown) by a chute 9 having its delivery end extending relative to the upper stretch of an endless belt conveyor 10 supported between drums 11 rotatably mounted on opposed vertical wall portions 12 of a channel member 13 secured to the top of table 7, as shown in Figure 5. The conveyor 10 is continuously actuated to convey the cap members from the delivery end of the chute 9 in the usual manner, as shown in application Serial No. 680,315. The belt conveyor 10 is maintained in taut condition by a roller 14 rotatably supported by blocks 15 slidably mounted in opposed vertical slideways 16 arranged in the vertical wall portions 12, as shown in Figure 3. The blocks 15 are adjusted in the slideways by a screw 17 rotatably retained at one end in each block and screw threaded in a plate 18 spanning the upper end of each slideway 16 and secured at the opposite ends to the vertical wall portions 12. The screws 17 are retained in adjusted position by a nut 19 engaged on the end portion of each screw projecting from the plates 18. The cap members are guided in a single row on the belt conveyor 10 by rails 20 supported by the vertical wall portions 12 and extending along the marginal portions of the upper stretch of the belt conveyor with one end portion of the rails juxtaposed to the side walls of the delivery end of the chute 9 and the opposite end portions terminating at the drum 11 furthest from the chute and arranged with a recess 21, as shown in Figure 3, for a purpose to be hereinafter described.

The belt conveyor delivers the cap members onto a pair of parallelly spaced rails 22 having the opposed edges beveled, as shown at 23 in Figures 5 and 6, to engage the flaring flange portion of the cap members and slidably support the cap members without scratching the decorative surface of said cap members. The rails 22 are supported in spaced parallel relation to the top of the table 7 and in horizontal alinement with the flaring flange portion of the cap members on the belt conveyor 10, as shown in Figures 3 and 4, by a transverse member 24 supported at the opposite ends on the top ends of leg portions of a U-shaped member 25 mounted on the top of table 7 by bolts 26 engaged in the transverse member, the U-shaped member and the table. The rails 22 are secured to the transverse member 24 by screws and nuts, as shown at 27. The flaring flange portion of the cap members are retained in engagement with the beveled edges 23 of the rails 22 by longitudinal guide strips 28 mounted at one marginal portion on the rails 22 by screws 29 with the other marginal portion extending over the beveled edges 23 and the top of the cap members c, as shown in Figures 5 and 6. The rails 22 and guide strips 28 are engaged in correspondingly shaped recesses in the underface of the transverse member 24, as shown in Figures 5 and 6. The guide strips 28 are extended over the opposite marginal portions of the belt conveyer 19 inwardly of the vertical guide rails 20 to retain the cap members flat on said belt conveyer, as shown in Figures 1, 3 and 4.

The cap members c are continuously advanced along the rails 22 from the belt conveyer 10 relative to devices for successively applying adhesive to the cap members, creating a heated zone to render the adhesive in the cap members tacky and viscous, inserting sealing pads in the closure members in contact with the tacky adhesive, and/or applying protective spots on the sealing pads. Said assembling devices are mounted on the table 7 on either side of the rails 22 and are not shown as they would only hinder a clear reading of the drawings in respect to the embodiment of the invention and they do not have any bearing on the invention.

The cap members c are continuously advanced relative to said assembling devices by rack bars 30 and 31 having equidistantly spaced fingers 32 and 33 on the marginal portions of the respective rack bars with the space between the fingers adapted to receive the portion of the cap members extending below the rails 22. The rack bar 30 is carried at the opposite ends and actuated in a circular clockwise direction, looking at Figure 1, by a pair of gears, only one gear 34 being shown in the present illustration, the complete structure being shown in application Serial No. 680,315. The gear 34 is secured to a shaft 35 rotatably supported by the table 7 and continuously rotated from a suitable source of power, as shown in application Serial No. 680,315. The gear 34 is eccentrically connected to the rack bar 30 by an arm 36 secured at one end to a supporting portion 37 of the rack bar 30, and the opposite end of the arm 36 pivotally mounted on a pin 38 fixed to and extending upwardly from the gear 34 eccentrically of the shaft 35. The rack bar 31 is carried at the opposite ends and actuated in a circular counter-clockwise direction, looking at Figure 1, by a pair of gears, only one of said gears being shown at 39 meshing with gear 34 and secured on a shaft 40 rotatably mounted on the table 7 and continuously rotated from the gear 34. The gear 39 is eccentrically connected to the rack bar 31 by an arm 41 secured at one end to a supporting portion 42 of the rack bar 31 and the opposite end of the arm 41 pivotally mounted on a pin 43 fixed in and projecting upwardly from said gear 39 eccentrically of the shaft 40, as shown in Figures 1 and 6.

The circular movements of the rack bars 30 and 31 successively move the fingers of one rack bar into engagement with the cap members to move said cap members along the rails 22 and out of engagement with said cap members while the corresponding fingers of the other rack bar are actuated to engage the advanced cap members and further move the cap members along the rails 22, as fully described and shown in application Serial No. 680,315.

The rack bars 30 and 31 are slidably supported by portions 37 and 42, respectively, on the connecting portion of the U shaped member 25, as shown in Figures 3, 4 and 5.

The forward movement of the cap members c on the belt conveyer 10 and the rearward movement of the end finger of each rack bar 30 and 31 will have a tendency to damage the cap members and it is the object of the present invention to prevent damage to the cap members. This is accomplished by permitting the first finger of each rack bar to be yieldingly moved laterally in an outward direction on the rack bar by the forward movement of the leading cap member on the belt conveyer 10. The first finger of each rack bar is in the form of a member 45 secured to the upper face of one end of an arm 46, as by screws 47, and said arm pivotally mounted at the opposite end to the rack bars 30 and 31, as at 48. The member 45 extends in a plane above the plane in which the arm 46 extends and has an oblique edge 52. The lower face of the rack bars 30 and 31 along the outer longitudinal edge thereof is cut-away or recessed, as indicated at 49 in Figures 1, 2 and 4, to receive the arm 46. The ends of the rack bars 30 and 31 extend in an oblique direction to engage the oblique edges 52 of the members 45 and limit the movement of the arm toward the recesses between the fingers 32 and 33 and properly position the fingers 45 in alinement with the fingers 32 and 33 when the arms 46 are fully engaged in said cut-away or recessed portion 49. The arms 46 are yieldingly urged into said cut-away portion 49 by a resilient member, such as a flat spring 50 having one end secured to the outer side of the rack bars 30 and 31, as by screws 51, and the opposite end portion engaging the outer side of the arms 46, as shown in Figures 1, 2 and 3. When either of said fingers 45 come into contact with a cap member c on the belt conveyer 10, said finger 45 will be moved laterally in an outwardly direction, as indicated in the broken line position shown in Figure 1, until the cap member has passed said finger by the travel of the belt conveyer 10 when the finger 45 will assume a position at the rear of the cap member under the force of the spring 50 to move said cap member along the rails 22.

The recesses 21 in the rails 20 permit the finger members 45 to travel relative to the upper stretch of the belt conveyer 10 and engage a closure cap on said belt conveyer.

Having thus described our invention, we claim:

1. In closure cap assembling apparatus, means to support closure caps in a row, a rack bar on each side of the closure cap supporting means having a series of equidistantly spaced fingers on the opposed longitudinal edges thereof and the first finger of each rack bar being pivotally mounted on the rack bar to have movement in a direction outwardly from the outer longitudinal edge of the rack bar and yieldingly urged to position in alinement with the other fingers of the rack bar, and means connected to each rack bar and adapted to continuously actuate the rack bars in a circular path of movement in opposite directions to successively engage the fingers of the rack bars with and move the closure caps along the supporting means therefor.

2. Closure cap assembling apparatus as claimed in claim 1, wherein the pivotally mounted fingers comprises a finger member, an arm carrying the finger member at one end portion of the arm and pivotally mounted at the other end portion on the rack bars, and means to yieldingly urge the arm to extend in alinement with the rack bar and position the finger member in alinement with the fingers of the rack bars.

3. Closure cap assembling apparatus as claimed in claim 2, wherein each outer longitudinal edge of the rack bars is arranged with a recess and the arms of the pivoted fingers are mounted in said recesses and the finger members are mounted on the arms to abut the end edges of the rack bars and limit the movement of the arms into the recesses and position the finger members in alinement with the fingers of the rack bars.

4. Closure cap assembling apparatus as claimed in claim 3, wherein the means to yieldingly urge the arm comprises a flat spring secured at one end portion on the rack bar with the opposite end portion engaging the arm.

JOHN C. JOHNSON.
WALTER H. JOHNSON.

REFERENCES CITED

The following references are of record in the file of this patent:

UNITED STATES PATENTS

| Number | Name | Date |
|---|---|---|
| 1,309,785 | Taylor | July 15, 1919 |
| 1,416,763 | Thom | May 23, 1922 |
| 1,469,557 | Goebel | Oct. 2, 1923 |